US007365634B2

(12) United States Patent
Brookbank

(10) Patent No.: US 7,365,634 B2
(45) Date of Patent: Apr. 29, 2008

(54) SYSTEM AND METHOD FOR SECURELY OPERATING A BARRIER ACTUATING DEVICE

(75) Inventor: Thomas A. Brookbank, Palatine, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 19 days.

(21) Appl. No.: 11/167,375

(22) Filed: Jun. 27, 2005

(65) Prior Publication Data

US 2006/0290489 A1 Dec. 28, 2006

(51) Int. Cl.
*B60R 25/00* (2006.01)

(52) U.S. Cl. ........................ 340/5.7; 340/5.71; 340/5.6

(58) Field of Classification Search ................. 340/5.6, 340/5.61, 5.64-5.67, 5.7-5.74, 825.72, 825.69
See application file for complete search history.

(56) References Cited

U.S. PATENT DOCUMENTS

| | | | | |
|---|---|---|---|---|
| 5,940,000 | A | 8/1999 | Dykema | |
| 7,038,409 | B1 * | 5/2006 | Mullet | 318/280 |
| 7,142,849 | B2 * | 11/2006 | Neuman | 455/420 |
| 2005/0242923 | A1 * | 11/2005 | Pearson et al. | 340/5.62 |

* cited by examiner

*Primary Examiner*—Jeffery Hofsass
*Assistant Examiner*—Hongmin Fan
(74) *Attorney, Agent, or Firm*—Fitch, Even, Tabin & Flannery

(57) ABSTRACT

A barrier actuating device is placed in close proximity to an authorization device. Electromagnetic enabling information that has been automatically sent from the authorization device is detected. Responsive to the detecting of the electromagnetic enabling information, an operation of the barrier actuating device is enabled so that the actuating device is operable to transmit a signal. The operation of the actuating device is disabled in the absence of the enabling information.

21 Claims, 3 Drawing Sheets

SYSTEM AND METHOD FOR SECURELY OPERATING A BARRIER ACTUATING DEVICE

FIELD OF THE INVENTION

The field of the invention relates to moveable barrier operators and, more specifically, to securely operating barrier actuating devices in these systems.

BACKGROUND

Different types of moveable barrier operators have been sold over the years and these systems have been used to actuate various types of moveable barriers. For example, garage door operators have been used to move garage doors and gate operators have been used to open and close gates.

Such barrier movement operators may include a wall control unit, which is connected to send signals to a head unit thereby causing the head unit to open and close the barrier. In addition, these operators often include a receiver unit at the head unit to receive wireless transmissions from a hand-held code transmitter or from a keypad transmitter, which may be affixed to the outside of the area closed by the barrier or other structure.

Barrier actuating devices are often employed in these systems to actuate moveable barrier operators that move barriers. For instance, a user may utilize a garage door opener from their vehicle to open and close a garage door or use a gate operator to open and close a gate.

Security problems occur in these systems when unauthorized users obtain a barrier actuating device of an authorized user in order to obtain entry into a secure area. For example, a portable transmitter can be stolen from its owner and used by the unauthorized user to open the garage door and gain entry into the home of the owner of the transmitter.

Previous systems sometimes manually enabled the operation of portable transmitters to prevent unauthorized use. However, these systems were cumbersome to use because they were not automatic in operation. Other systems used beacons to enable transmitter operation. However, the beacons enabled all transmitters no matter the identity of the person actuating the transmitter. Consequently, unauthorized users could still use the transmitters to gain entry into secure areas.

SUMMARY

A system and method are provided that securely operate a barrier actuating device. The approaches described herein allow a barrier actuating device to be automatically enabled when it is in close proximity to an authorization device. Conveniently, the authorization device may be an item uniquely identified or carried by the owner of the barrier actuating device such as a fob or an RFID device positioned within the vehicle of the owner. Consequently, the actuating device will not operate until enabled and unauthorized users will be prevented from using the barrier actuating device to improperly gain entry into a secure or prohibited area.

In accordance with the principles described herein a barrier actuating device is placed in close proximity to an authorization device. Electromagnetic enabling information that has been automatically sent from the authorization device is detected. The electromagnetic enabling information may comprise a number of forms such as a wireless signal, a Radio Frequency (RF) signal, a visible light signal, or a sonic signal. Responsive to the detecting of the electromagnetic enabling information, an operation of the barrier actuating device is enabled so that the actuating device is operable to transmit a signal. The signal may be transmitted to actuate a variety of devices such as a moveable barrier operator, a light control device, or an alarm. Conversely, the operation of the actuating device is disabled in the absence of the enabling information.

The barrier actuating device may be a portable transmitter that is placed in close proximity to a personally carried authorization device. In one example, the personally carried authorization device is a fob. In another example, the barrier actuating device may be a portable transmitter that is placed in close proximity to an RFID signal source. The RFID signal source carried by a person or placed within an authorized vehicle.

Thus, approaches are described that provide for the secure operation of barrier actuating devices. The barrier actuating devices are enabled by being positioned in close proximity to an authorization device thereby preventing unauthorized use of the actuating device to actuate moveable barriers.

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION

Figure 1:
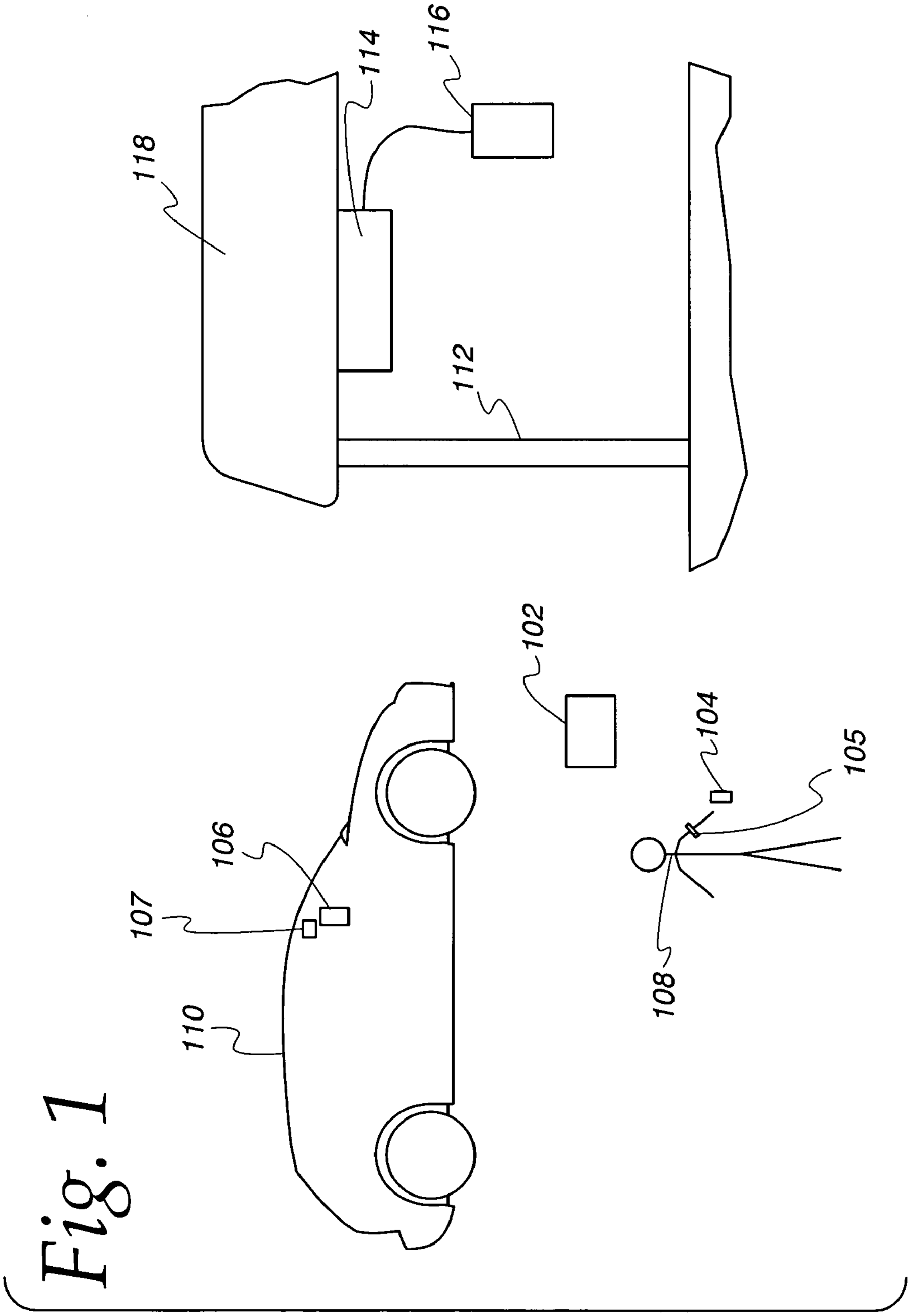
FIG. 1 is a block diagram of a system for operating a moveable barrier operator according to the present invention.

Referring now to the drawings and especially FIG. 1, a system and method for operating a moveable baffler system is described. A barrier actuating device 102 is used to actuate a barrier operator 114, which is used to move a barrier 112. Another barrier actuating device 106 may be placed in a vehicle 110 and still another barrier actuating device 104 may be carried by a person 108. The barrier operator 114 is placed in a garage 118 and the barrier operator 114 is coupled to a wall control unit 116. The wall control unit 116 can be used to control the operation of the operator 114 as well as perform programming functions at the operator 114.

The description contained herein assumes that the operator 114 is a garage door operator. However, it will be understood that the operator 114 may be any type of entry control device or system such as a security system, entry system, sliding door operator, or swinging door operator. Further, although the barrier 112 is described as being a garage door, it will be understood that the barrier 112 may be any type of barrier such as a sliding gate, swinging gate, or shutters. Other examples of operators and barriers are possible.

Authorization devices 105 and 107 are positioned so as to emit electromagnetic authorization information that enables the operation of the barrier actuating devices 102, 104, and 106. The barrier actuating devices 102, 104, and 106 are placed in proximity to the authorization devices 105 or 107 so that the electromagnetic authorization information can be received. For instance, the authentication device 107 may have a range limited to the vehicle 110 and the barrier actuating device must be positioned within this range in order to operate. In another example, the authentication device 105 may be limited to the immediate vicinity of the person 108.

In addition, the authorization devices 105, and 107 may be any type of device that is capable of sending electromagnetic enabling information. For example, the devices 105 and 107 may be fobs or RFID signal sources. In the particular example of FIG. 1, the device 105 may be a fob while the device 107 may be a RFID signal source. Other examples of authorization devices are possible.

In one example of the operation of the system of FIG. 1, one of the barrier actuating devices 102, 104, or 106 is placed in close proximity to the authorization devices 105 or 107 so as to be within the operating range of the authorizing device. Electromagnetic enabling information that has been automatically sent from the authorization devices 105 or 107 is detected by the barrier actuating device 105 or 107. Responsive to the detecting of the electromagnetic enabling information, an operation of the barrier actuating device 102, 104, or 106 is enabled so that the actuating device 102, 104, or 106 is operable to transmit a signal. On the other hand, the operation of the actuating device 102, 104, or 106 is disabled in the absence of the enabling information.

A signal may be transmitted from the barrier actuating devices to actuate a variety of other devices or systems such as a moveable barrier operator, a light control device, or an alarm. The electromagnetic enabling information may include a number of forms such as a wireless signal, a Radio Frequency (RF) signal, a visible light signal, or a sonic signal.

Figure 2:
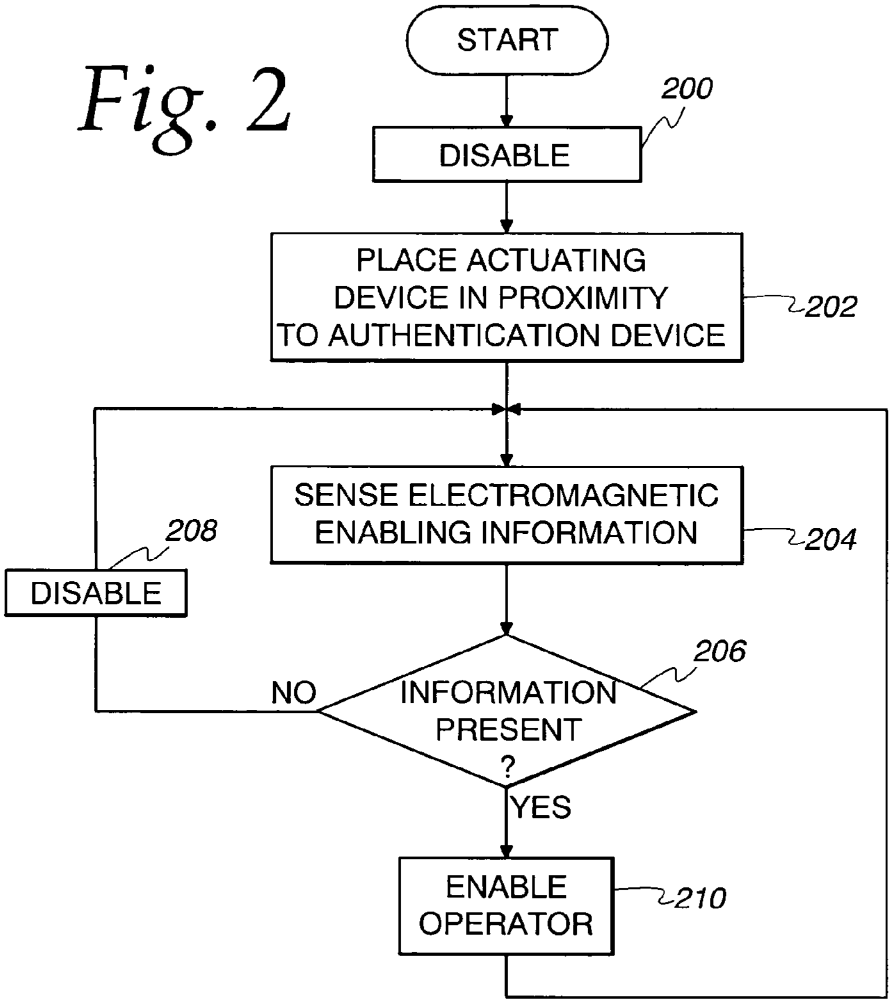
FIG. 2 is a flow chart showing one example of an approach for operating a moveable barrier according to the present invention.

Referring now to FIG. 2, an example of an approach for operating a barrier operator is described. At step 200, the actuating device enters a disabled state. In this state, the device cannot make any transmissions. Consequently, the actuating device can not be used to move a barrier.

At step 204, the actuating device is placed in close proximity to an authorization device so as to be within the operating range of the authorizing device. In one example, an authorized user may be carrying an RFID signal source. In another example, the authorization device may be attached to a fob such as a key chain carried by an authorized user. At step 204, the actuating device senses electromagnetic enabling information that may be transmitted from an authorization device. At step 206, it is determined if the information is present. If the answer is negative, at step 208, the actuating device is placed (or continues operation) in the disabled state. If the answer is affirmative, then at step 210, the operation of the actuating device is enabled. In this state, the actuating device can transmit signals to the moveable barrier operator. The moveable barrier operator can then actuate a barrier, for example, opening a garage door. Execution then continues at step 204 as described above.

Figure 3:
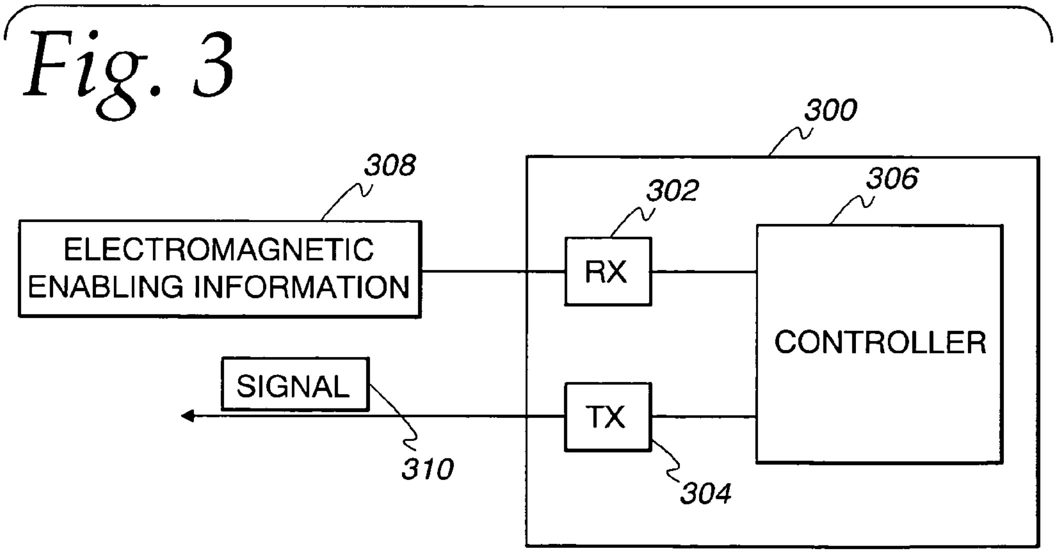
FIG. 3 is a block diagram of an actuating device according to the present invention.

Referring now to FIG. 3, one example of a barrier actuating device is described. The actuating device 300 includes a receiver 302, a transmitter 304, and a controller 306. The controller 306 is coupled to the receiver 302 and the transmitter 304. The controller 306 is programmed to enable an operation of device 300 so as to transmit a signal 310 to a barrier operator system from the transmitter 304 when electromagnetic enabling information 308 is detected and to disable the operation of the device 300 in the absence of electromagnetic enabling information. The controller 306 may also be programmed to transmit a request message to an authorization device using the transmitter 304 and to responsively receive electromagnetic enabling information from the authorization device from the receiver 302.

Figure 4:
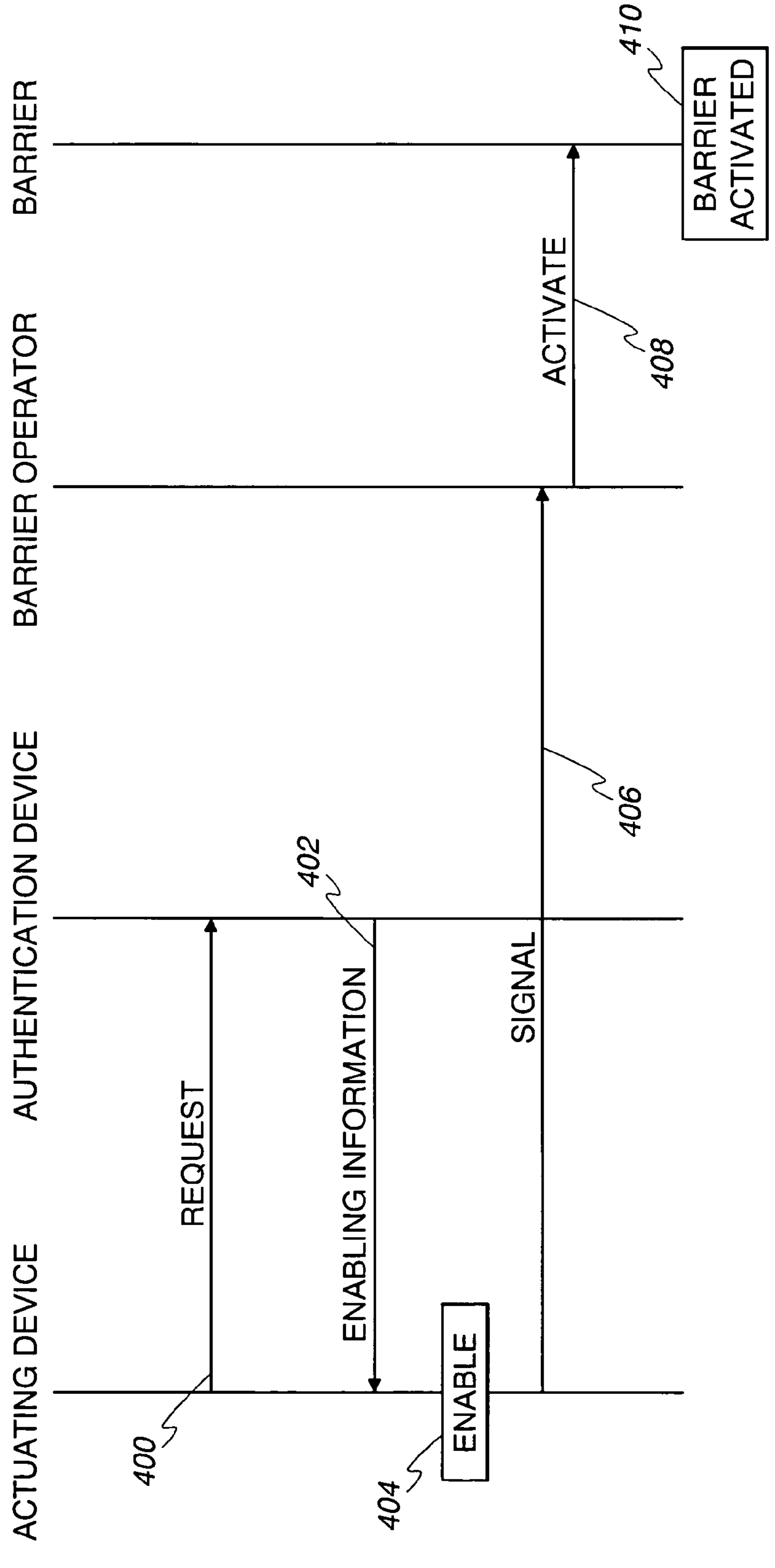
FIG. 4 is a call flow diagram of an approach for operating a moveable barrier system according to the present invention.

Referring now to FIG. 4, another example of an approach for operating a moveable barrier operator is described. At step 400, a request is sent from a barrier actuating device to an authorization device. Such a request may comprise a burst of RF energy to interrogate an RFID containing authorization device. The authorization device considers the request and, at step 402, grants the request by transmitting enabling information to the barrier actuating device. At step 404, the barrier actuating device is enabled. At step 406, a user presses a button or performs some other action to actuate the actuating device and a signal is transmitted from the actuating device to a barrier operator. At step 408, the barrier operator sends a signal to the barrier in order to move the barrier. At step 410, the barrier is actuated. For example, if the barrier is in the open position, it may be moved to the closed position or if it is in a closed position, it may be moved to the open position.

Thus, approaches are described herein that provide for the enhanced security when operating barrier actuating devices. The actuating devices are enabled by being placed in close proximity to an authorization device thereby preventing unauthorized use of the actuating device to actuate moveable barriers.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A method of operating a barrier actuating device in a moveable barrier operator system comprising:

placing a non-enabled barrier actuating device in close proximity to an authorization device, the actuating device having previously stored code for operating the barrier operator system;

placing the actuating device proximate to a barrier operator so that the barrier operator can receive signals from the actuating device;

automatically sending enabling electromagnetic information from the authorization device to the non-enabled barrier actuating device;

detecting the automatically sent electromagnetic enabling information with the barrier actuating device;

responsive to the detecting of the electromagnetic enabling information, enabling an operation of the barrier actuating device so that the actuating device is operable to transmit a signal to the barrier operator, the signal in response to a received input and representative of the previously stored code in the actuating device; and disabling the operation of the barrier actuating device in the absence of the enabling information from the authorization device.

2. The method of claim 1 wherein placing a barrier actuating device in close proximity to an authorization device comprises positioning a portable transmitter in close proximity to a personally carried authorization device.

3. The method of claim 2 wherein the personally carried authorization device is a fob.

4. The method of claim 1 wherein placing a barrier actuating device in close proximity to an authorization device comprises positioning a portable transmitter in close proximity to an RFID signal source.

5. The method of claim 4 comprising carring the RFID signal source on a person.

6. The method of claim 4 comprising placing the RFID signal source in an authorized vehicle.

7. The method of claim 1 wherein the signal from the actuating device is sent directly to the operator to actuate the operator when the actuating device is enabled.

8. The method of claim 1 comprising transmitting a signal from the actuating device directly to the operator to actuate a light control device when the barrier actuating device is enabled.

9. The method of claim 1 comprising transmitting a signal from the actuating device directly to the operator to actuate an alarm when the barrier actuating device is enabled.

10. The method of claim 1 wherein detecting the electromagnetic enabling information comprises detecting a signal selected from from the group consisting of a wireless signal, an RF signal, a visible light signal, and a sonic signal.

11. A method of operating a user portable barrier actuating device in a barrier operator system comprising:

placing a non-enabled barrier actuating device having a previously stored code to operate a barrier operator in close proximity to an authorization device;

transmitting a request to an authorization device;

responsive to transmitting the request, detecting electromagnetic enabling information automatically emitted from the authentication device;

responsive to detecting the automatically emitted electromagnetic enabling information, enabling an operation of the non-enabled barrier actuating device to be enabled to be operable to send a signal to the barrier operator, the signal in response to a received input and representative of the previously stored code; and disabling the operation of the barrier actuating device in the absence of the transmitted electromagnetic enabling information from the authorization device.

12. The method of claim 11 wherein the signal from the actuating device is sent directly to the operator to actuate a moveable barrier operator when the barrier actuating device is enabled.

13. The method of claim 11 comprising transmitting a signal from the actuating device directly to the operator to actuate a light control device when the barrier actuating device is enabled.

14. The method of claim 11 comprising transmitting a signal from the actuating device directly to the operator to activate an alarm when the barrier actuating device is enabled.

15. The method of claim 11 wherein detecting the electromagnetic information comprises detecting a signal selected from the group consisting of a wireless signal, an RF signal, a visible light signal, and a sonic signal.

16. A barrier actuating device for use in a barrier operator system comprising:

a receiver having an input;

a transmitter having an output; and a controller coupled to the receiver and the transmitter, the controller being programmed to receive electromagnetic enabling information at the input of the receiver, the controller being programmed to receive the enabling information which is automatically being sent from an authorization device and to enable an operation of the barrier actuating device when the electromagnetic enabling information is detected so as to transmit a signal to a barrier operator from the output of the transmitter, and the controller being programmed to disable the operation of the barrier actuating device in the absence of electromagnetic enabling information.

17. The barrier actuating device of claim 16 wherein the electromagnetic enabling information comprises a signal selected from the group consisting of a wireless signal, an RF signal, a visible light signal, and a sonic signal.

18. A user portable transceiver device to be used by a user to transmit a previously stored code to a barrier operator system, the transceiver device having a non-enabled and enabled state and comprising:

a receiver having an input;

a transmitter having a transmitting output; and a controller coupled to the receiver and the transmitter, the controller being programmed to transmit a request message to an authorization device from the transmitting output and to responsively receive electromagnetic enabling information from the authorization device at the receiver input, the controller being programmed to change the transceiver device to the enabled state from the non-enabled state and which enabled state is effective to provide an operation of the user portable transceiver device so as to permit the transmission of the previously stored code, to a barrier operator from the transmitting output of the transceiver device when electromagnetic enabling information is detected, and the controller being programmed to disable the operation of the user portable transceiver device to the non-enabled state in the absence of electromagnetic enabling information.

19. The barrier actuating transceiver device of claim 18 wherein the electromagnetic enabling information is signal selected from the group consisting of a wireless signal, an RF signal, a visible light signal, and a sonic signal.

20. A transmitter to be used by a user to transmit a previously stored code to a barrier operator system, the transmitter, the transmitter having a non-enabled and enabled state and comprising:

having a previously stored code which is effective for transmission directly to an operator;

a receiver having an input;

a transmitting output; and a controller coupled to the receiver and the transmitting output, the controller being programmed to receive electromagnetic enabling information from an actuation device at the input of the receiver, the controller being programmed to move the transmitter to the enabled state, which enabled state is effective to provide an operation of the transmitter which operation includes directly transmitting the previously stored code to an operator when the electromagnetic enabling information is detected at the receiver input so as to permit the transmission of the previously stored code, and the controller being programmed to disable the operation of the transmitter to the non-enabled state in the absence of the electromagnetic enabling information.

21. The barrier actuating device of claim 20 wherein the electromagnetic enabling information comprises a signal selected from the group consisting of a wireless signal, an RF signal, a visible light signal, and a sonic signal.

* * * * *

UNITED STATES PATENT AND TRADEMARK OFFICE

CERTIFICATE OF CORRECTION

PATENT NO. : 7,365,634 B2
APPLICATION NO. : 11/167375
DATED : April 29, 2008
INVENTOR(S) : Thomas A. Brookbank It is certified that error appears in the above-identified patent and that said Letters Patent is hereby corrected as shown below:

Claim 5, Column 5, Line 9; Change "carring" to -- carrying --; and

Claim 10, Column 5, Line 25; Delete "from" (second occurrence).

Signed and Sealed this

Twelfth Day of August, 2008

Jon W. Dudas

JON W. DUDAS
*Director of the United States Patent and Trademark Office*

UNITED STATES PATENT AND TRADEMARK OFFICE

CERTIFICATE OF CORRECTION

PATENT NO. : 7,365,634 B2
APPLICATION NO. : 11/167375
DATED : April 29, 2008
INVENTOR(S) : Thomas A. Brookbank It is certified that error appears in the above-identified patent and that said Letters Patent is hereby corrected as shown below:

IN THE CLAIMS:

Claim 11, Column 5, Line 35; Change "authentication" to -- authorization --.

Signed and Sealed this
Fourth Day of August, 2015

Michelle K. Lee

Michelle K. Lee
*Director of the United States Patent and Trademark Office*